United States Patent
Tran et al.

(10) Patent No.: US 11,729,692 B2
(45) Date of Patent: Aug. 15, 2023

(54) MOBILITY MANAGEMENT FOR MOBILE DEVICE EDGE COMPUTING

(71) Applicant: T-Mobile USA, Inc., Bellevue, WA (US)

(72) Inventors: Emile Minh Tran, Sammamish, WA (US); Antoine T. Tran, Bellevue, WA (US); Jeremy M. Tran, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 84 days.

(21) Appl. No.: 17/304,809

(22) Filed: Jun. 25, 2021

(65) Prior Publication Data

US 2022/0417816 A1   Dec. 29, 2022

(51) Int. Cl.
*H04W 4/00* (2018.01)
*H04W 36/30* (2009.01)
*H04W 36/00* (2009.01)
*H04W 36/32* (2009.01)

(52) U.S. Cl.
CPC ....... *H04W 36/30* (2013.01); *H04W 36/0072* (2013.01); *H04W 36/32* (2013.01)

(58) Field of Classification Search
CPC ............. H04W 36/30; H04W 36/0072; H04W 36/32
USPC .......................................................... 370/331
See application file for complete search history.

(56) References Cited

U.S. PATENT DOCUMENTS

| | | | |
|---|---|---|---|
| 8,542,656 B2* | 9/2013 | Love | H04W 74/0866 370/332 |
| 9,883,436 B2* | 1/2018 | Brown | H04W 36/125 |
| 11,265,696 B2* | 3/2022 | Zou | H04W 4/50 |
| 11,297,554 B2* | 4/2022 | Tofighbakhsh | H04W 36/30 |

(Continued)

FOREIGN PATENT DOCUMENTS

| EP | 3576460 A1 | 12/2019 |
|---|---|---|
| WO | WO2020173552 A1 | 9/2020 |

OTHER PUBLICATIONS

"Edge Computing And Deployment Strategies For Communication Service Providers," Ericsson White Paper GFMC-20:000097 Feb. 2020, 13 pages.

(Continued)

*Primary Examiner* — Amancio Gonzalez
(74) *Attorney, Agent, or Firm* — Lee & Hayes, P.C.

(57) ABSTRACT

A base station and computing resources to be used by a user equipment (UE) within a network can be selected based on information, such as an identification of base station(s) that may be used by the UE, and the location and performance of the base station(s) and the available computing resources. In some examples, when a mobility controller determines to switch the base station for a UE, the computing resources used to perform application processing can also be switched. For instance, when the current base station is switched, the computing resources used to perform application processing for the UE may be moved to computing resources that are closer to the different base station. In other examples, the mobility controller may determine to delay switching the UE to the different base station if the performance of the mobile application would be better using the current base station and current computing resources.

18 Claims, 6 Drawing Sheets

(56) References Cited

U.S. PATENT DOCUMENTS

| | | | | |
|---|---|---|---|---|
| 11,343,718 | B2* | 5/2022 | Schnieders | H04W 72/1257 |
| 11,363,666 | B2* | 6/2022 | Wang | H04L 1/0003 |
| 11,405,860 | B2* | 8/2022 | Eriksson | H04L 67/10 |
| 11,431,597 | B1* | 8/2022 | Ho | H04W 24/02 |
| 2012/0127955 | A1* | 5/2012 | Gandham | H04W 36/00837 |
| | | | | 370/331 |
| 2017/0086115 | A1* | 3/2017 | Chung | H04L 45/44 |
| 2019/0379587 | A1* | 12/2019 | Coutinho | H04L 41/06 |
| 2020/0045601 | A1* | 2/2020 | Pedersen | H04W 36/0072 |
| 2020/0322836 | A1 | 10/2020 | Lekutai et al. | |
| 2021/0014755 | A1 | 1/2021 | Caceres | |
| 2021/0410013 | A1* | 12/2021 | Yang | H04L 47/76 |
| 2022/0132492 | A1* | 4/2022 | Schnieders | H04W 24/08 |
| 2022/0132529 | A1* | 4/2022 | Schnieders | H04W 72/10 |
| 2022/0279445 | A1* | 9/2022 | Shrivastava | H04W 24/02 |
| 2022/0286961 | A1* | 9/2022 | Chang | H04W 36/0066 |
| 2022/0377131 | A1* | 11/2022 | Szilagyi | H04L 41/0894 |

OTHER PUBLICATIONS

Extended European Search Report dated Oct. 27, 2022 for European Patent Application No. 22174924.5, 9 pages.
Tran et al., "Collaborative Mobile Edge Computing in 5G Networks: New Paradigms, Scenarios, and Challenges," IEEE Communications Magazine, Special Issue on Fog Computing and Networking, Apr. 2017, 7 pages.

\* cited by examiner

MOBILITY MANAGEMENT FOR MOBILE DEVICE EDGE COMPUTING

BACKGROUND

Mobile networks are expanding rapidly. For example, not only are 4G-LTE networks expanding, wireless service providers are deploying 5G networks. As these networks expand, more and more applications are relying on the performance and low latency characteristics of these networks. Some of these applications, however, may not operate properly if the latency of the network exceeds some specified value. For example, applications associated with autonomous driving, augmented reality, virtual reality, and the like may rely on very low latencies (e.g., less than 100 ms), whereas other applications, such as applications relating to monitoring networks, may perform satisfactorily with higher latencies (e.g., >1000 ms). Performing processing within the specified latency associated with these types of applications can be challenging. Adding to this challenge is the fact that wireless networks can become more congested at various points thereby increasing the latency of the network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
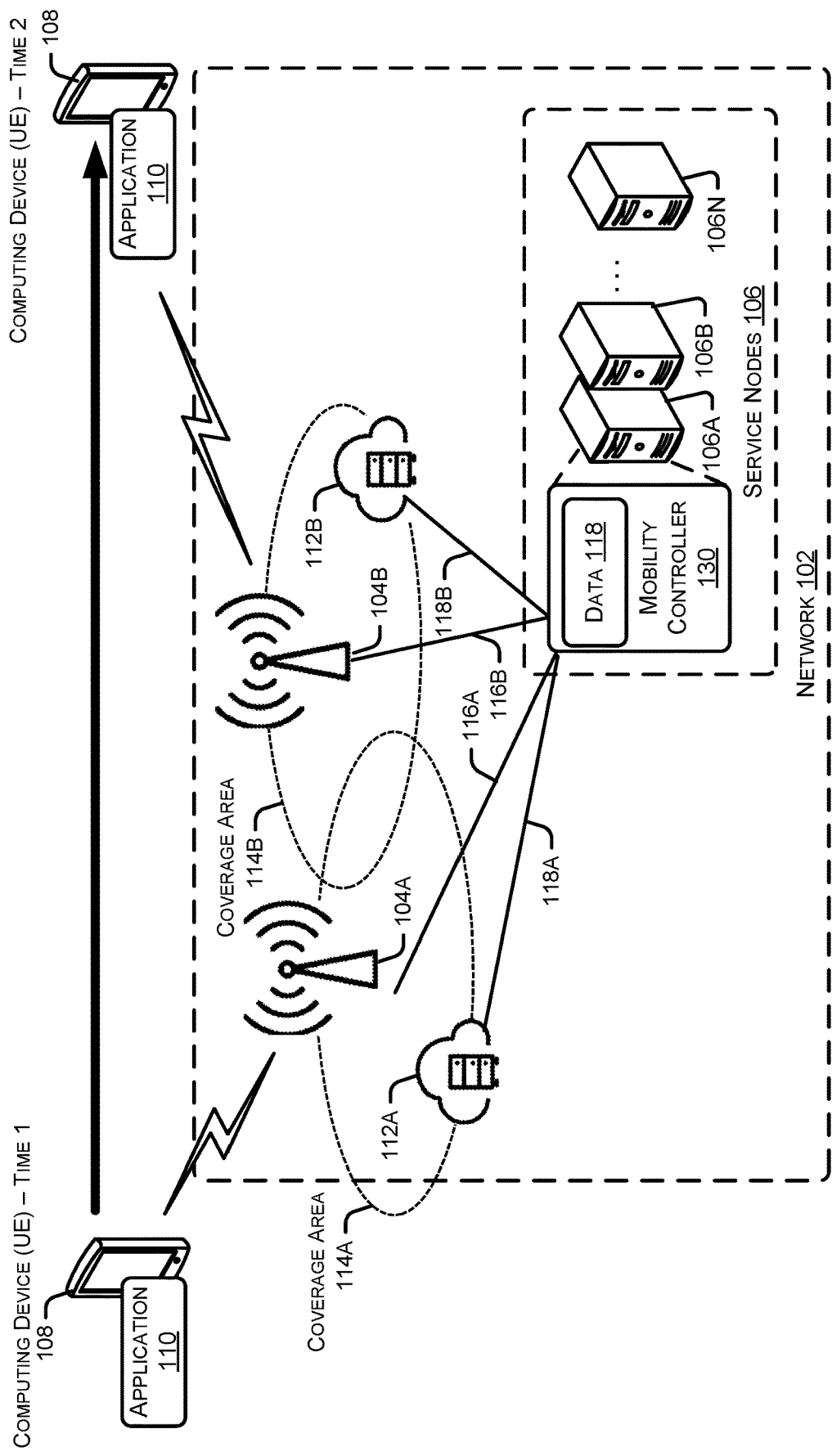
FIG. 1 is a block diagram showing an illustrative environment for mobility management for mobile device edge computing.

Described herein are techniques and systems for mobility management for mobile device edge computing. Using techniques described herein, a base station and computing resources to be used by a user equipment (UE), such as a mobile computing device, can be selected based on information, such as an identification of base station(s) that may be used by the UE, and the location and performance of the base station(s) and the computing resources in the telecommunications network. In some examples, when a mobility controller determines to switch the UE from a current base station to a different base station, the computing resources used to perform application processing for an application associated with UE can also be switched. For instance, when the current base station is switched to the different base station, the computing resources used to perform application processing for the UE may be moved to computing resources that are closer to the different base station. In other examples, the mobility controller may determine to delay switching the UE to the different base station if the performance of the mobile application would be better using the current base station and current computing resources compared to using the different base station and different computing resources.

Processing associated with an application (which may be referred to herein as "application processing") can be performed at dynamically determined locations associated with a mobile network. The determination of the location within the network can be based on the location of the mobile device, the location of computing resources in relation to a base station being used by the mobile device, latency measurements within the network, latency specifications of the application (which may be referred to herein as a "target latency"), related latency (e.g., jitter, packet loss, packet delivery rate, . . . ), the availability of computing resources at a particular location, and the like. Generally, latency refers to the time it takes a packet of data to move from one point within the network to another point within the network.

In some configurations, techniques described herein utilize computing resources, such as server computing devices, deployed at different locations within the mobile network to perform application processing. For instance, server computing devices may be placed at or near a wireless base station (BS), between the base station and other locations within the network, at the core network, at the Internet, or at other locations to provide applications with the computing resources that meet the target latencies of the application.

While computing resources located near or at the base station may provide the lowest latency for application processing, not all applications utilized have the same low target latency specifications. As a result, computing resources can be positioned throughout the network "path" with the applications specifying the lowest target latency specifications to be executed nearer the base station, the applications having the largest target latency specifications farthest away from the edge (e.g., the core network, the Internet), and the applications with target latency specifications between the lowest and largest somewhere between the B S and the farthest location away from the edge. When latency associated with application processing for an application becomes too high at one location, the application processing for the application can be moved to computing resources located at a different location.

To assist in determining what computing resources to use to perform application processing and whether or not to switch base stations, performance measurements may be obtained at different points (i.e., locations) within the network (e.g., one or more locations near the base station, the core network, and the like). In some examples, network probes and/or monitoring systems are placed at various locations within the network to determine network latencies between different measurement points within the network. The latency measurements can be obtained from commercially available network tools and/or from other software/hardware. According to some configurations, the network probes and/or monitoring systems are configured to monitor the network latencies (e.g. continuously and/or at predetermined times).

In some configurations, this live latency information associated with different links in the network can be used to determine the traffic status of the network and/or predict future traffic within the network. This latency information can then be used (e.g., by a mobility controller) to determine the location of where to perform the application processing. In some examples, a mobility controller can perform a live traffic routing calculation to direct network traffic to computing resources located within the network. For example, the mobility controller can locate and/or change the location of application processing between different locations within the network. More details are provided below with regard to FIGS. 1-7.

FIG. 1 is a block diagram showing an illustrative environment 100 for mobility management for mobile device edge computing. The environment 100 may include a telecommunications network 102 that is operated by a wireless service provider and one or more other networks coupled to network 102, such as the Internet 212 illustrated in FIG. 2. The environment 100 is illustrated in simplified form and may include many more components.

Generally, mobile edge computing (MEC) refers to performing application processing associated with an application 110 using computing resources that are located closer to the UE 108 (e.g., nearer the "edge" of the network) to increase the performance of the application. As briefly discussed above, using techniques described herein, a mobility controller 130 selects a base station 104 and computing resources, such as computing resources 112, to be used to perform application processing 224 for a mobile application 110 based on the base station 104 being used by the UE 108 and the location and performance of the computing resources 108 in the telecommunications network 102.

The network 102 may include one or more base stations 104, such as base station 104A and base station 104B, one or more service nodes 106, and one or more other computing resources 108 that may be positioned at various locations within the network 102 (e.g., near a base station 104, or at some other location). A base station 104 may handle traffic and signals between electronic devices, such as the computing device 108 and other computing devices (not shown), and a core network of the network 102. For example, the base station 104 may perform the transcoding of speech channels, allocation of radio channels to electronic devices, paging, transmission and reception of voice and data, as well as other functions.

The base station 104 may include several base transceiver stations (BTS). A BTS may include a transceiver, antenna, and additional network switch and control equipment that provide a network cell for facilitating wireless communication between computing devices and the core network of the network 102. In some instances, the base station 104 may include an eNodeB and/or a gNodeB.

The computing device (UE) 108 may be an electronic device such as a smart phone, a personal digital assistant, a netbook, a laptop computer, and/or another electronic device that is capable of sending and/or receiving voice or data via the network 102 and/or a Wi-Fi network. For example, the computing device 108 can be integrated into a vehicle, a drone, a plane, a bicycle, a mobile device, and the like. In some instances, the computing device 108 can be configured to send and receive data using any wired or wireless protocols.

The mobility controller 130 is node that is configured to utilize data 118, such as location data (e.g., of the UE 108, base station 104, computing resources 112, . . . ), latency data associated with the network 102, coverage area data indicating coverage area 114 for available base stations 104, performance of computing resources data that can perform processing for the application 110, predicted congestion data of the network, and the like. For example, the mobility controller 130 node can determine to switch the base station 104 and/or application processing for an application 110 to utilize computing resources 112B instead of computing resources 112A when UE 108 begins to use base station 104B.

Upon the determination to move the UE 108 to use computing resources 112B, that may be within the base station 104 or external from the base station 104, the mobility controller 130 can move data used for the application processing from computing resource 112A to computing resource 112B. In some examples, the mobility controller 130 may determine to use computing resources 112 located at other areas within the network 102, e.g., within the core network (e.g., utilizing one or more service nodes 106), at computing resources 112 located within a gateway, such as gateway 216 illustrated in FIG. 2, within the Internet 212, and/or at other locations within the network 102, such as at local services associated with a service node 106.

According to some configurations, the mobility controller 130 is configured to perform live traffic routing calculations to assist in determining where to position the application processing for application 110. The mobility controller 130 can locate and/or change the location of application processing between different locations within the network 102. While the service nodes 106 are illustrated within the network 102, one or more other computing devices may be located outside of the network 102. For example, an application server, or some other server or device, may be connected to the network 102 via one or more external packet switched networks, such as the Internet 212.

Application 110 may be any type of application. Some example applications include, but are not limited to autonomous vehicle applications, automotive applications, Internet of Things (IoT) applications, monitoring applications, browser applications, messaging applications, voice applications (e.g., Voice over Internet Protocol "VoIP" applications), video applications, and the like.

In the example illustrated by FIG. 1, the UE 108 at time 1 is using base station 104A, that includes coverage area 114A, and computing resources 112A for application processing. Mobility controller 130 communicates with base station 104A using link 116A and communicates with computing resources 112A using link 118A. Mobility controller 130 communicates with base station 104B using link 116B and communicates with computing resources 112B using link 118B. According to some examples, mobility controller 130 determines when to switch the UE 108 from base station 104A to 104B and/or the computing resources 112A to other computing resources based on different information.

For instance, the mobility controller 130 may base a determination of whether to switch base stations 104 and/or computing resources 112 based on the location of the UE 108, a projected movement of the UE 108, the location of computing resources in relation to a base station 104A currently being used and/or a base station 104B that may be used by the UE 108, latency measurements within the network 102, latency specifications of the application 110, related latency, the availability of computing resources 112 at a particular location, and the like.

As an example, the mobility controller 130 may determine to switch from base station 104A to base station 104B, and from computing resources 112A to computing resources 112B, when the performance of the application 110 is predicted to be better using computing resources 112B and base station 104B as compared to continuing to use base station 104A and computing resources 112A. In some cases (e.g., within the overlapping first coverage area 114A and second coverage area 114B, the UE 108 may either use base station 104A or base station 104B. If the mobility controller 130 determines that the performance of the application 110 will not be better by switching to base station 104B and/or computing resources 112B, then the mobility controller 130 may delay the switch. According to some configurations, UE 108 may use computing resources 112A and 112B that are active at the same time to allow for a faster and smoother computing resource hand-off.

Figure 2:
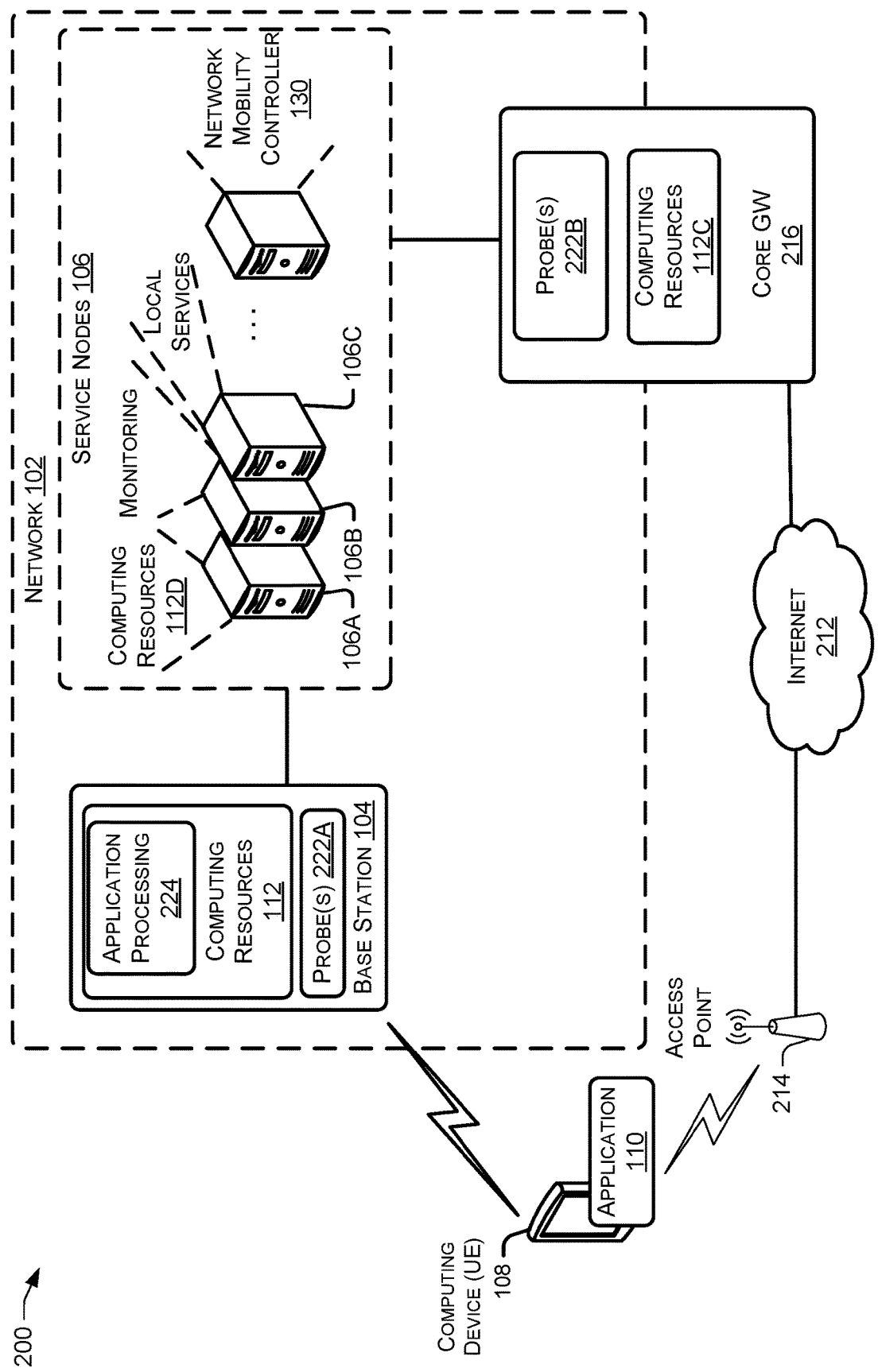
FIG. 2 is a block diagram showing an illustrative environment that includes a mobility controller that monitors latencies at different locations within the network.

FIG. 2 is a block diagram showing an illustrative environment 200 that includes a mobility controller that monitors latencies at different locations within the network. The environment 200 is similar to the environment 100 of FIG. 1 but includes additional details. As illustrated, environment 200 may include a network 102 that is coupled to one or more other networks, such as the Internet 212.

According to some configurations, the base station 104 and/or other devices/components within network 102 can include probe(s) 222A that are configured to measure latencies associated with the base station 104 and/or other components. For example, the probe(s) 222A may determine processing times associated with modules in the base station 104, the upload and download times to the computing device 108, the latency between the base station 104 and the service nodes 106 located within the core network, and the like. The latencies can be associated with different types of connections, including wired and/or wireless connections.

The core gateway (GW) 216 may be responsible for routing voice communication to other networks, as well as routing data communication to external packet switched networks, such as the Internet 212. For example, the one or more service nodes 106 may be a Policy and Charging Rules Function (PCRF) node (not shown) that is utilized to enforce policy rules of the network. The PCRF node can be configured to automatically make policy decisions for each subscriber (e.g., each user equipment (UE)) active on the network. For example, the PCRF may be utilized to allocate bandwidth of the network as well as provide different levels of service to different computing devices on the network. In some configurations, the PCRF node can be used to assist in determining the location of where to perform application processing for one or more applications, such as application 110. Additionally, some data can be prioritized within the network.

According to some configurations, the network includes a monitoring node 106B, a local services node 106C, and a node to perform functionality of the mobility controller 130. The monitoring node 106B is configured to measure and/or obtain network measurements (e.g., latency) associated with different locations within the network (e.g., from one or more locations within the base station 104, latency measurements associated with the core network, and the like). In some examples, the monitoring node 106B obtains latency data from network probe(s) 222, and/or other monitoring systems located at different locations within the network 102. The latency measurements can be obtained from commercially available network tools and/or from other software/hardware. According to some configurations, the network probes and/or monitoring systems are configured to continuously monitor the network latencies throughout different locations within the network.

In some examples, the mobility controller 130 node is configured to utilize latency data to locate application processing for an application, such as application 110, within the network 102. For example, the mobility controller 130 node can position application processing 124 for application 110 to utilize computing resources 112C within the base station 104, computing resources 112D within the core network (e.g., utilizing one or more service nodes 106 such as service node 106A), at computing resources 120E located within the gateway 216, within the Internet 212, and/or at other locations within the network 102, such as at local services associated with node 106C. In some examples, a mobility controller 130 is configured to perform live traffic routing calculations to assist in determining where to position the application processing for application 110. The mobility controller 130 can locate and/or change the location of application processing between different locations within the network and coordinate the transition from a current base station 104 to a different base station 104.

According to some configurations, a client application, such as application 110, on the UE 108 may establish data communication with the network 102 through a data connection to the base station 104. When a communication request arrives at the network 102, one or more of the service nodes 106 may determine the identity of the originating computing device for the communication (e.g., using a telephone number, IMEI ImsI, IP address) as well as the identity of the computing devices to send the communication. According to some configurations, the application 110 on the computing device 108 may connect to the service nodes 106, or some other component such as an application server, via the Internet 212. In such instances, the application 110 may connect to the Internet 212 via Wi-Fi access point 214. Accordingly, data traffic from the application 110 may be routed to the service nodes 106 by the gateway 216 of the network 102.

As briefly discussed above, application processing associated with an application, such as application 110, can be performed at different locations within the network where computing resources, such as computing resources 112. In some configurations, an application 110 is associated with a target latency that is used to identify an upper limit for latency associated with processing for the application. An application 110 may specify the target latency and/or a target latency can be associated with the application 110 based on a type of the application, or some other information indicating the target latency. For example, application 110 can specify the target latency (e.g., 10 ms, 50 ms, 100 ms, 1000 ms, . . . ) or the mobility controller 130 can determine a type of the application and associate the target latency based on the type of application. Generally, applications 110 that utilize real-time data are associated with lower target latencies, whereas applications 110 that do not utilize real-time data are associated with higher target latencies.

In some examples, the mobility controller 130 can access target latencies associated with application 110. For example, a PCRF node in the service nodes 106 may identify that an application 110 utilized by computing device 108 is a type of application that has a target latency of under 100 ms, and as such, cause the application processing for the application 110 to be performed at a location within the network that satisfies the target latency based on the current latency data 118 obtained from different locations within the network 102.

According to some configurations, the location of the computing resources 112 used for application processing 124 for an application 110 can be determined by a software component and/or a hardware component that operates within network 102, such as within the core network (e.g., mobility controller 130), or a mobility controller 130 that is located at some other location within the network 102.

Figure 3:
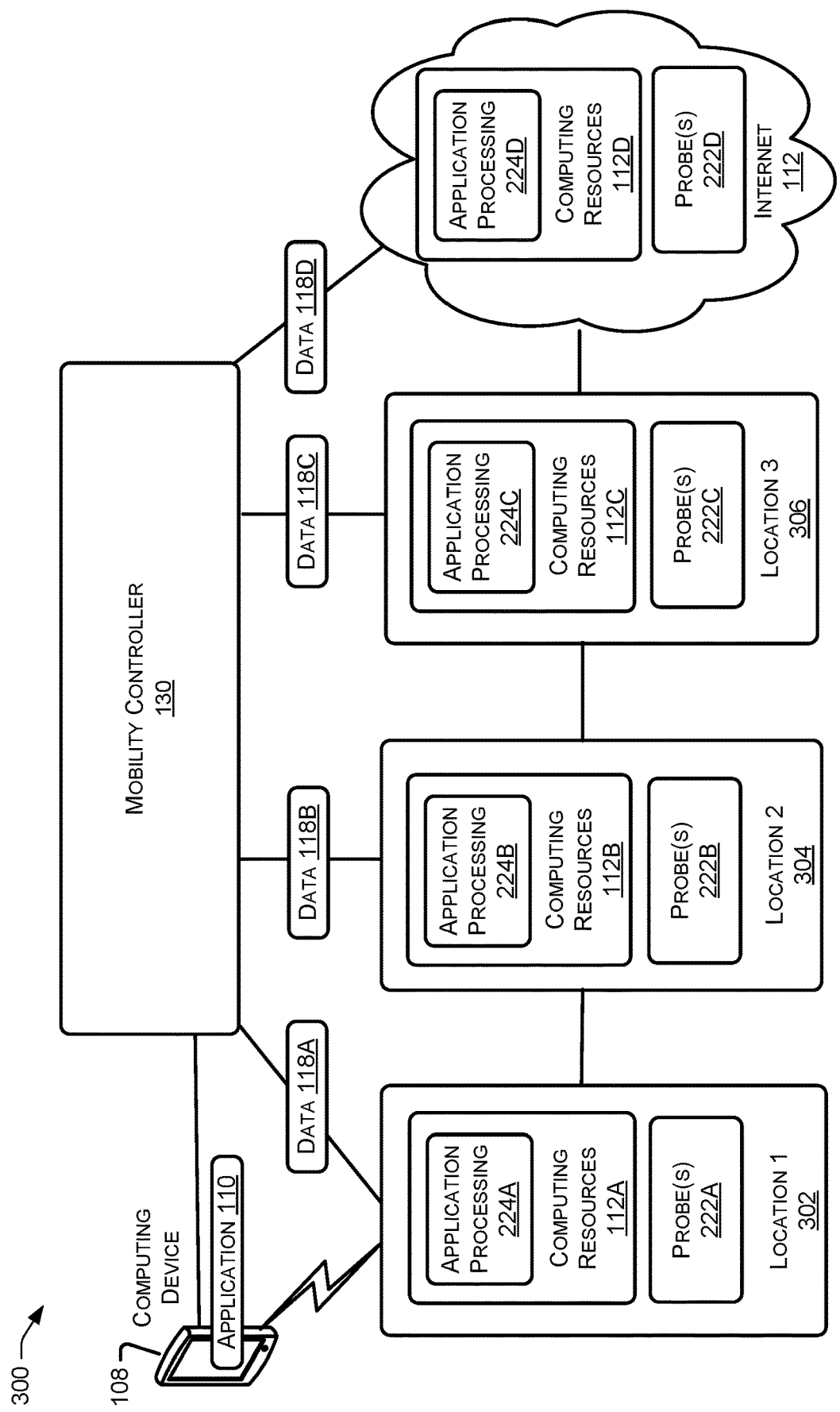
FIG. 3 is a block diagram illustrating a system that includes a mobility controller that uses data obtained from a network to assist in determining the location of computing resources to use for application processing within the network.

FIG. 3 is a block diagram showing an illustrative environment 300 that includes a mobility controller 130 that uses data obtained from a network to assist in determining the location of computing resources 112 to use for application processing 224 within the network. The environment 300 is illustrated in simplified form and may include many more components.

Environment 300 shows computing resources 112 available for application processing 124 at different locations within a network and the Internet 212. As illustrated, environment 300 includes computing resources 112A for application processing 224A at location 1 (302), computing resources 112B for application processing 224B at location 2 (304), computing resources 112C for application processing 224C at location 3 (306), and computing resources 112D for application processing 224D at Internet 212. For purposes of explanation, location 1 is closest to the computing device 108 (i.e. closest to the "edge" of the network), location 2 is second closest to the computing device 108, location 3 is third closest to the computing device 108, and location 4 is furthest from the computing device 108. Generally, the latency increases as the location is farther from the edge of the network. While four locations are shown, more or fewer locations may be utilized to perform application processing for an application.

As discussed above, mobility controller 130 is configured to dynamically determine the location of the computing resources 112 to utilize for application processing 224. The determination can be based on different data, such as latency measurements obtained from probe(s) 222, predicted performance data, current availability/predicted availability of computing resources 112, location and/or movement of the UE 108, and the like.

As briefly discussed above, some applications 1100 have different performance specifications. Some applications 110 may have low target latency specifications and some applications have a more flexible target latency specification. Even though application processing 224 for an application 110 may initially be performed utilizing computing resources 112 deployed at one location within the network 102, the application processing 224 can be moved to another location based on the current network conditions and/or predicted network conditions. The network conditions may include information such as, but not limited to latencies within the network, availability of computing resources within the network 102, location of the UE 108, location of the base station(s) 104 and computing resources 112 that may be used by the UE 108.

The mobility controller 130 obtains data 118, such as latency data from different locations within the network 102. The latency data can be determined using network probes, such as probe(s) 222A-222D (which may be referred to herein as "network probes 222"), monitoring systems, and or other hardware/software components. For example, probe(s) 222A can determine latencies associated with the first location. The probe(s) 222 can be commercially available probes/monitoring system, internal equipment (BS, PGW/SGW, etc.) Key Performance Indicator (KPI) values, and/or custom hardware/software components. The probe(s) 322A can also be configured to determine the latency between the UE 108 to different nodes within the network 102 (e.g., an eNodeB that may be located at location 1 302, as well as determine other latencies (not shown).

Mobility controller 130 receives the data 118 and determines one or more locations within the network 102 that are capable of performing the application processing 224 for the application 110 based on the performance specifications associated with the application 110. As an example, assume that application 110 has a target latency of 100 ms or less and that the data 118 indicates that computing resources 112A and computing resources 112B satisfy the target latency of 100 ms. In this case, the mobility controller 130 can select computing resources 112A and/or computing resources 112B to provide the application processing for application 110. For an application that has a higher target latency, such as 250 ms, the mobility controller 130 can select any one or more of computing resources 112A-1312D.

The latency measurements for the network 102 can change throughout the day. For example, as the use of the network 102 increases/decreases, the latency measurements will fluctuate. As such, some applications having application processing performed at one location (e.g., at location 3 (306) utilizing computing resources 112C) may no longer be reliable to meet the desired target latency of the application. In some configurations, the mobility controller 130 monitors (e.g., in real-time) the data 118 within the network, the location of the UE 108, and the base station 104 being used by the UE 108, and determines the location of where to perform application processing for the applications within the network.

In response to determining a location that meets the application specifications. the mobility controller 130 provides instructions to at least one of the locations to instruct the location to perform application processing 224 for the application 110.

As briefly discussed above, application processing associated with an application, such as application 110, can be performed at different locations within the network where computing resources 112, such as computing resources 112A-120E are located. In some configurations, the mobility controller 130 and/or some other component determines a target latency associated with the application 110. The target latency identifies an upper limit for latency associated with application processing for the application 110. In some configurations, the application 110 specifies the target latency. In other examples, the mobility controller 130 determines the type of application. For example, application 110 can specify the target latency (e.g., 10 ms, 50 ms, 100 ms, 1000 ms, . . . ) or the mobility controller 130 can determine a type of the application and associate the target latency based on the type of application. Generally, applications 110 that utilize real-time data are associated with lower target latencies, whereas applications 110 that do not utilize real-time data are associated with higher target latencies.

After selecting one or more locations to perform application processing 224, the mobility controller 130 can change the selected location for application processing 224 for an application. For example, the mobility controller 130 can change the location of application processing for an application, such as application 110, based on current latency data 118 and/or projected latencies associated with the network.

Figure 4:
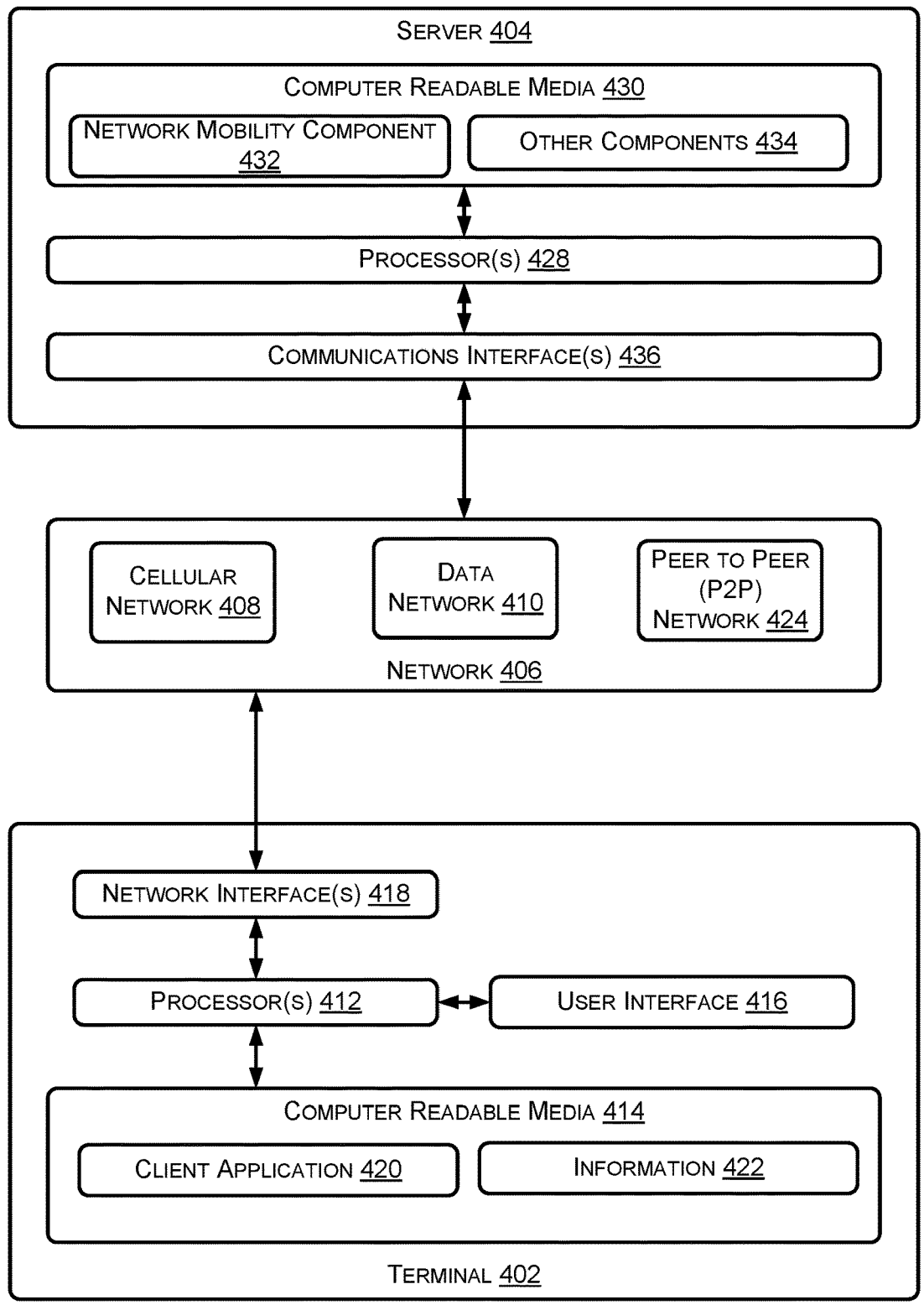
FIG. 4 is a block diagram illustrating a system that includes a network mobility component for selecting and causing application processing to be performed at a location within a network.

FIG. 4 is a block diagram illustrating a system 400 that includes a network mobility component 432 for selecting and causing application processing to be performed at a location within a network according to some implementations. The system 400 includes a terminal 402, which can represent computing device 108 of FIG. 1, coupled to a server 404, via a network 406. The server 404 can represent one or more of the service nodes 106. The network 406 can represent, e.g., networks 102 or 112, or other networks.

The network 406 can include one or more networks, such as a cellular network 408, a data network 410, and a peer to peer (PTP) network 424. The network 406 can include one or more core network(s) connected to terminal(s) via one or more access network(s). Example access networks include LTE, WIFI, GSM Enhanced Data Rates for GSM Evolution (EDGE) Radio Access Network (GERAN), UTRAN, and other cellular access networks. Message transmission, reception, fallback, and deduplication as described herein can be performed, e.g., via 3G, 4G, 5G, WIFI, or other networks.

The cellular network 408 can provide wide-area wireless coverage using a technology such as GSM, Code Division Multiple Access (CDMA), UMTS, LTE, or the like. Example networks include Time Division Multiple Access (TDMA), Evolution-Data Optimized (EVDO), Advanced LTE (LTE+), 5G New Radio (NR), Device-To-Device (D2D), Vehicle-To-Everything (V2X) direct communication, Generic Access Network (GAN), Unlicensed Mobile Access (UMA), Orthogonal Frequency Division Multiple Access (OFDM), GPRS, EDGE, Advanced Mobile Phone System (AMPS), High Speed Packet Access (HSPA), evolved HSPA (HSPA+), VoIP, VoLTE, IEEE 802.1x protocols, wireless microwave access (WIMAX), WIFI, and/or any future IP-based network technology or evolution of an existing IP-based network technology. Communications between the server 404 and terminals such as the terminal 402 can additionally or alternatively be performed using other technologies, such as wired (Plain Old Telephone Service, POTS, or PSTN lines), optical (e.g., Synchronous Optical NETwork, SONET) technologies, and the like.

The data network 410 can include various types of networks for transmitting and receiving data (e.g., data packets), including networks using technologies such as WIFI, IEEE 802.15.1 ("BLUETOOTH"), Asynchronous Transfer Mode (ATM), WIMAX, and other network technologies, e.g., configured to transport IP packets. In some examples, the server 404 includes or is communicatively connected with an IWF or other device bridging networks, e.g., LTE, 3G, and POTS networks. In some examples, the server 404 can bridge SS7 traffic from the PSTN into the network 406, e.g., permitting PSTN customers to place calls to cellular customers and vice versa.

In some examples, the cellular network 408, the data network 410, and the P2P network 424 can carry voice or data. For example, the data network 410 can carry voice traffic using VoIP or other technologies as well as data traffic, or the cellular network 408 can carry data packets using HSPA, LTE, or other technologies as well as voice traffic. The P2P network 424 can carry signaling/data traffic from neighboring devices/network in a mesh-like communication such as Skype, or a direct communication such as D2D, vehicle-to-everything (V2X) messages, and the like. Some cellular networks 408 carry both data and voice in a packet-switch (PS) format. For example, many LTE networks carry voice traffic in data packets according to the VoLTE standard. Various examples herein provide origination and termination of, e.g., carrier-grade voice calls on, e.g., networks 406 using circuit-switching (CS) transports or mixed VoLTE/3G transports, or on terminals 402 including OEM handsets and non-OEM handsets.

The terminal 402 can be or include a wireless phone, a wired phone, a tablet computer, a laptop computer, a wristwatch, or other type of terminal. The terminal 402 can include one or more processors 412, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media (CRM) 414, such as memory (e.g., random access memory (RAM), solid state drives (SSDs), or the like), disk drives (e.g., platter-based hard drives), another type of computer-readable media, or any combination thereof. The CRM or other memory of terminal 402 can hold a datastore, e.g., an SQL or NoSQL database, a graph database, a BLOB, or another collection of data. The terminal 402 can further include a user interface (UI) 416, e.g., including an electronic display device, a speaker, a vibration unit, a touchscreen, or other devices for presenting information to a user and receiving commands from the user. The terminal 402 can further include one or more network interface(s) 418 configured to selectively communicate (wired or wirelessly) via the network 406, e.g., via an access network 212 or 408, 410.

The CRM 414 can be used to store data and to store instructions that are executable by the processors 412 to perform various functions as described herein. The CRM 414 can store various types of instructions and data, such as an operating system, device drivers, etc. The processor-executable instructions can be executed by the processors 412 to perform the various functions described herein.

The CRM 414 can be or include computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, non-transitory medium which can be used to store the desired information and which can be accessed by the processors 412. Tangible computer-readable media can include volatile and nonvolatile, removable and non-removable media implemented in any method or technology for storage of information, such as computer readable instructions, data structures, program components, or other data.

The CRM 414 can include processor-executable instructions of a client application 420. The client application 420, e.g., a native or other dialer, can permit a user to originate and terminate communication sessions associated with the terminal 402, e.g., a wireless phone. The client application 420 can additionally or alternatively include an SMS, RCS, or presence client, or a client of another telephony service offered by the server 404. The client application 420 can also be any other type of application, such as application 110 described herein.

The CRM 414 can store information 422 identifying the terminal 402. The information 422 can include, e.g., an IMEI, an IMSI identifying the subscriber using terminal 402, or other information discussed above. The CRM 414 can additionally or alternatively store credentials (omitted for brevity) used for access, e.g., to IMS or RCS services.

The server 404 can include one or more processors 428 and one or more CRM 430. The CRM 430 can be used to store processor-executable instructions of a network mobility component 432, as well as one or more other components 434. In some configurations, the server 404 can be configured as a network mobility controller 130, a monitoring node 106B, and the like. The processor-executable instructions can be executed by the one or more processors 428 to perform various functions described herein, e.g., with reference to FIGS. 1-3, and 5-6.

In some examples, server 404 can communicate with (e.g., is communicatively connectable with) terminal 402 or other devices via one or more communications interface(s) 436, e.g., network transceivers for wired or wireless networks, or memory interfaces. Example communications interface(s) 436 can include ETHERNET or FIBER CHANNEL transceivers, WIFI radios, or DDR memory-bus controllers (e.g., for DMA transfers to a network card installed in a physical server 404).

In some examples, processor 412 and, if required, CRM 414, are referred to for brevity herein as a "control unit." For example, a control unit can include a CPU or DSP and instructions executable by that CPU or DSP to cause that CPU or DSP to perform functions described herein. Additionally, or alternatively, a control unit can include an ASIC, FPGA, or other logic device(s) wired (physically or via blown fuses or logic-cell configuration data) to perform functions described herein. Other examples of control units can include processor 428 and, if required, CRM 430.

Figure 5:
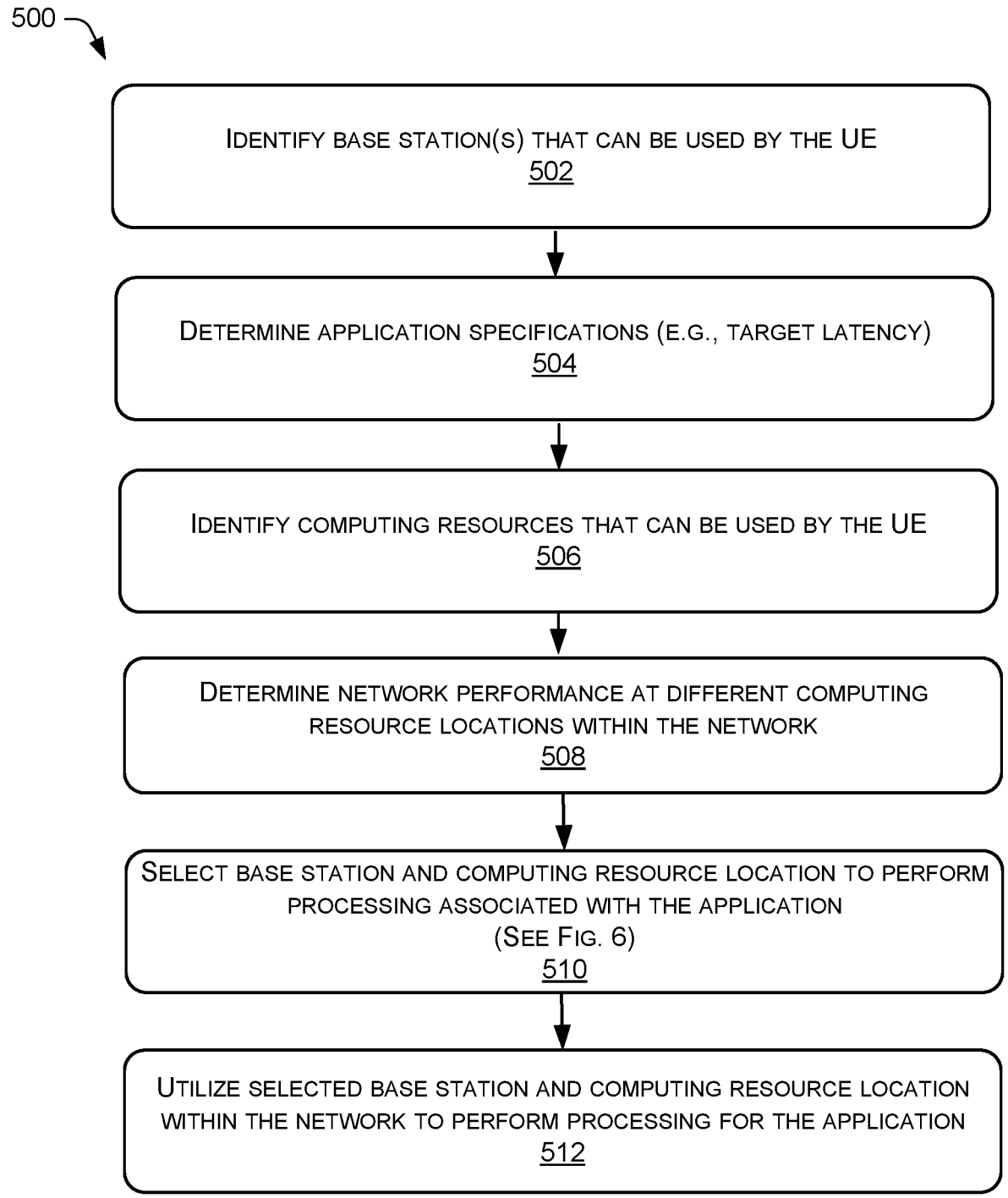
FIG. 5 is a flow diagram of an example process that includes determining a base station and computing resources to use within a mobile network to perform application processing.
Figure 6:
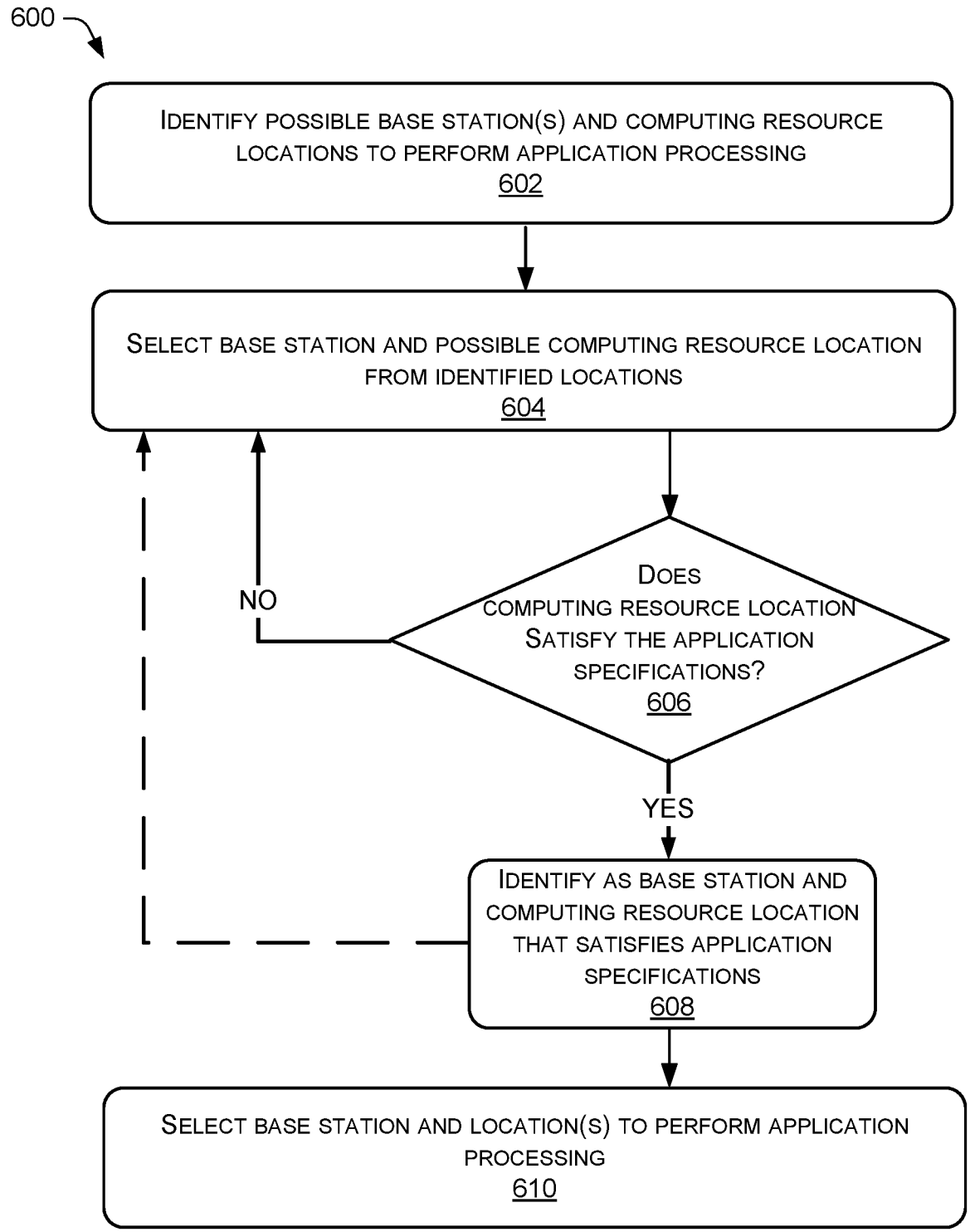
FIG. 6 is a flow diagram of an example process that includes selecting a base station and a location in a network to perform application processing.

In the flow diagrams of FIGS. 5 and 6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 500 and 600 are described with reference to the systems 100, 200, 300, and 400 as described above, although other models, frameworks, systems and environments may implement these processes.

FIG. 5 is a flow diagram of an example process 500 that includes determining a base station 104 and computing resources 112 to be used by a UE 108. The process 500 may be performed by one or more computing devices, such as the computing devices described with regard to FIGS. 1-4.

At 502, the base station(s) 104 that may be used by the UE 108 may be determined. As discussed above, a UE 108 may move within network 102 and may be within a coverage area 114 of one or more base stations 104. In some cases, a prediction may be determined by the mobility controller 130, or some other device/component, that the UE 108 is moving from coverage area 114A of base station 104A to coverage area 114B of base station 104B.

At 504, application specifications may be determined for an application 110. As discussed above, the application 110 may be any type of application. For example, application 110 can be associated with autonomous driving, augmented reality, virtual reality, monitoring networks, video streaming, voice calls, or any other type of application. Some applications 110 specify a low target latency, whereas other applications specify a higher target latency. Generally, applications 110 that utilize real-time data are associated with lower target latencies, whereas applications 110 that do not utilize real-time data are associated with higher target latencies. According to some configurations, application 110 defines the target latency. In other configurations, the mobility controller 130 identifies the target latency based on a type of the application 110. In some configurations, the mobility controller 130 accesses a table, or some other data, that indicates a target latency with the type of application 110.

At 506, computing resources 112 that can be used by the UE 108 to perform application processing 124 for an application 110 can be identified. As discussed above, the computing resources 112 may be located near a base station 104, and/or at some other location within the network 102.

At 508, network performance at different computing resource 112 locations can be determined. As discussed above, network performance data, such as latency measurements can be obtained from different locations within the network 102. In some examples, network probes 122 and/or monitoring systems are placed at various locations within the network (e.g., base station, core network, gateway, . . . ) to determine network latencies between different points within the network 102. The latency measurements can be obtained from commercially available network tools and/or from other software/hardware. According to some configurations, the network probes 122 and/or monitoring systems are configured to monitor the network latencies (e.g. continuously and/or at predetermined times and provide latency data 118 to mobility controller 130. As discussed above, the mobility controller 130, or some other component, can calculate the latencies associated with different locations within the network using the latency data 118 obtained from the network probe(s) 122 and/or monitoring systems.

At 510, a base station and computing resource location may be selected to perform application processing associated with the application 110. As discussed above, the mobility controller 130 determines what base stations that may be used by the UE 108, receives the data 118 and determines one or more locations within the network for performing the application processing 124 for the application 110. Generally, the mobility controller 130 selects the location for application processing that meets the target latency of the application. Generally, the lower the target latency, the nearer the base station 104 and processing for the application 110 will be to the computing device 108. (See FIG. 6 for more details)

At 510, the base station 104 and selected computed resources 112 within the network 102 is utilized to perform processing for the application 110. As discussed above, the mobility controller 130 provides instructions 308 to the selected location(s) to cause the computing resources 112 associated with the selected location(s) to perform the application processing 124.

FIG. 6 is a flow diagram of an example process 600 that includes identifying a location in a network to perform application processing according to some implementations. The process 600 may be performed by one or more computing devices, such as the computing devices described with regard to FIGS. 1-4.

At 602, possible base station(s) 104 and computing resources 112 to perform application processing are identified. As discussed above, a base station 104 used by the UE 108 may be selected with many different locations within the network 102, and/or external from the network, can include computing resources 112 for performing application processing 224. For example, a mobile network service provider may position computing resources throughout the network 102 and utilize available computing resources 120 outside of the network (e.g., Internet 112) to perform application processing 124. For instance, the locations can include but are not limited to computing resources 120 located at/near base stations, gateways, core network, and the like.

At 604, a base station 104 and computing resource location 112 is selected from the identified computing resource locations. As discussed above, the mobility controller 130 selects one of the identified base station(s) 104 and locations such that a determination can be made as to whether the selected base station and location satisfies the application specifications such as a target latency. According to some configurations, the mobility controller 130 first selects a possible base station 104 for the UE 108 and the location nearest to the UE 108 which is near the edge of the network (e.g., the location having the smaller latency), and then the next location farther from the UE 108 is selected. The mobility controller 108 may repeat this for other possible base station(s) 104. In other examples, the ordering of the selection can be changed (e.g., random, farthest location from the edge to nearest to the edge, . . . ).

At 606, a determination is made as to whether the selected base station and computing resource location satisfies the application 110 specifications. When the selected base station 104 location 112 satisfies the application 110 specifications, the process moves to 608. When the selected location does not satisfy the application 110 specifications, the process returns to 604 where another location is selected.

At 608, the base station 104 and computing resource location 112 is identified as satisfying the application 110 specifications. As discussed above, one or more base station(s) 104 and locations 112 may satisfy the application 110 specifications. In some configurations, the process returns to 604 if there are additional base stations/locations that have not been checked to determine as to whether or not the base station/location satisfies the application 110 specifications. In other examples, the process moves to 610 when a base station and one or more of the locations satisfying the target latency are selected to perform the application processing for application 110.

At 610, a base station and one or more locations are selected to perform application processing 124 for the application 110. As discussed above, one or more locations inside or outside of the network 102 can be selected to perform the application processing in combination with a base station 104 selected for the UE 108. In some examples, the mobility controller 130 can select a location nearer the edge based on anticipated traffic within the network. For example, the mobility controller 130 identifies that the network is becoming more congested and selects a location nearer to the computing device 108. In yet other configurations, the application processing 224 can be divided between different locations The various techniques described above are assumed in the given examples to be implemented in the general context of computer-executable instructions or software, such as program components, that are stored in computer-readable storage and executed by the processor(s) of one or more computers or other devices such as those illustrated in the figures. Generally, program components include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method performed by one or more processors of a mobility controller configured with specific instructions, the computer-implemented method comprising:
  determining, by the mobility controller, that a user equipment (UE), associated with a first base station within a network affiliated with a wireless service provider, is within a coverage area of a second base station, wherein the UE is using first computing resources at a first location within the network to perform application processing for an application associated with the UE;
  determining, by the mobility controller and from a plurality of locations associated with the network, second computing resources at a second location to perform the application processing for the application;
  obtaining, by the mobility controller and from probes at different locations with the network, latency data for the different locations; and
  determining, by the mobility controller, based at least in part on a first performance level associated with the application processing using the first computing resources and a second performance level associated with a use of the second computing resources to perform the application processing for the application, and based on the latency data, to perform one or more operations, including:
    switching from the first base station to the second base station; and
    selecting the second computing resources to perform the application processing for the application,
  wherein the mobility controller is separate and distinct from the UE, the first base station, and the second base station.

2. The computer-implemented method of claim 1, further comprising determining a target latency for the application, and wherein selecting the second computing resources is based at least in part on the target latency.

3. The computer-implemented method of claim 1, further comprising determining that the UE is moving toward an edge of a first coverage area of the first base station and is within the coverage area of the second base station.

4. The computer-implemented method of claim 1, wherein obtaining the latency data comprises receiving first latency data from a probe at the first base station, second latency data from a probe at the second base station, third latency data from a probe at the first computing resources, and fourth latency data from a probe at the second computing resources.

5. The computer-implemented method of claim 1, wherein determining the second computing resources is based, at least in part, on application specifications for the application.

6. The computer-implemented method of claim 1, wherein selecting the second computing resources comprises determining that a latency associated with the second location is less than a target latency associated with the application.

7. The computer-implemented method of claim 1, wherein selecting the second computing resources comprises determining that the second computing resources are closer to the second base station compared to the first computing resources.

8. A system comprising:
- a first base station within a network affiliated with a wireless service provider;
- a second base station within the network affiliated with the wireless service provider;
- computing resources that include first computing resources at a first location within the network and second computing resources at a second location within the network;
- one or more processors of a mobility controller that is separate and distinct from the first base station and the second base station; and
- one or more memories storing instructions that, when executed by the one or more processors, perform acts including:
  - determining that a user equipment (UE), associated with the first base station, is within a coverage area of the second base station, wherein the UE is using first computing resources at a first location within the network to perform application processing for an application associated with the UE;
  - determining, from the computing resources, second computing resources to perform the application processing for the application;
  - obtaining, from probes at different locations with the network, latency data for the different locations; and
  - determining, based at least in part on a first performance level associated with the application processing using the first computing resources and a second performance level associated with a use of the second computing resources to perform the application processing for the application and based on the latency data, to perform one or more operations, including:
    - causing the UE to switch from the first base station to the second base station; and
    - causing the second computing resources to perform the application processing for the application,
  - wherein the mobility controller is further separate and distinct from the UE.

9. The system of claim 8, the acts further comprising determining a target latency for the application, and wherein selecting the second computing resources is based at least in part on the target latency.

10. The system of claim 8, the acts further comprising determining that the UE is moving toward an edge of a first coverage area of the first base station and is within the coverage area of the second base station.

11. The system of claim 8, wherein obtaining the latency data comprises receiving first latency data from a probe at the first base station, second latency data from a probe at the second base station, third latency data from a probe at the first computing resources, and fourth latency data from a probe at the second computing resources.

12. The system of claim 8, wherein determining the second computing resources is based, at least in part, on application specifications for the application.

13. The system of claim 8, wherein selecting the second computing resources comprises determining that a latency associated with the second location is less than a target latency associated with the application.

14. The system of claim 8, wherein selecting the location of the second computing resources comprises determining that the second computing resources are closer to the second base station compared to the first computing resources.

15. A non-transitory computer-readable media storing computer-executable instructions that, when executed, cause one or more processors of a mobility controller to perform acts comprising:
- determining that a user equipment (UE), associated with a first base station within a network affiliated with a wireless service provider, is within a coverage area of a second base station, wherein the UE is using first computing resources at a first location within the network to perform application processing for an application associated with the UE;
- determining, from a plurality of locations associated with computing resources of the network, second computing resources at a second location to perform the application processing for the application;
- obtaining, from probes at different locations with the network, latency data for the different locations; and
- determining, based at least in part on a second performance level associated with a use of the second computing resources to perform the application processing for the application and based on the latency data, to perform one or more operations, including:
  - switching from the first base station to the second base station; and
  - selecting the second computing resources to perform the application processing for the application,
- wherein the mobility controller is separate and distinct from the first base station, the second base station, and the UE.

16. The non-transitory computer-readable media of claim 15, the acts further comprising:
- determining a target latency for the application,
- wherein selecting the second computing resources is based at least in part on the target latency.

17. The non-transitory computer-readable media of claim 15, wherein obtaining the latency data comprises receiving first latency data from a probe at the first base station, second latency data from a probe at the second base station, third latency data from a probe at the first computing resources, and fourth latency data from a probe at the second computing resources.

18. The non-transitory computer-readable media of claim 15, wherein selecting the second computing resources comprises determining that a latency associated with the second location is less than a target latency associated with the application.

\* \* \* \* \*